United States Patent [19]

Kanota et al.

[11] Patent Number: 4,967,289
[45] Date of Patent: Oct. 30, 1990

[54] PCM SIGNAL RECORDING APPARATUS

[75] Inventors: Keiji Kanota, Kanagawa; Noboru Murabayashi, Tokyo, both of Japan

[73] Assignee: Sony Corporation, Tokyo, Japan

[21] Appl. No.: 248,399

[22] Filed: Sep. 23, 1988

[30] Foreign Application Priority Data

Sep. 30, 1987 [JP] Japan ............................... 62-246917
Oct. 5, 1987 [JP] Japan ............................... 62-251109

[51] Int. Cl.⁵ .......................... G11B 5/09; G11B 5/02
[52] U.S. Cl. .................................... 360/46; 360/68
[58] Field of Search ....................... 360/46, 68, 61

[56] References Cited

U.S. PATENT DOCUMENTS

4,535,371 8/1985 Harr et al. ............................. 360/46
4,656,533 4/1987 Sakai et al. ............................ 360/46
4,764,816 8/1988 Heitmann .............................. 360/68
4,821,125 4/1989 Christensen et al. .................. 360/46

Primary Examiner—Vincent P. Canney
Attorney, Agent, or Firm—Alvin Sinderbrand

[57] ABSTRACT

In an apparatus for recording data on a magnetic recording medium by means of a magnetic head, a recording current supplied to such head, for example, from a recording amplifier, is varied in accordance with the recording density of the data being recorded so as to reduce the bit error rate upon playback or reproducing of the recorded data. For each recording density, the recording current supplied to the magnetic head is a predetermined amount greater than the optimal value of the recording current at a Nyquist frequency of the digital data being recorded.

14 Claims, 8 Drawing Sheets

|   | BIAS RESISTOR | REC QUALITY | MAGNETIC TAPE | TAPE SPEED |
|---|---|---|---|---|
| 1 | $R_1$ | STANDARD | MP | SP |
| 2 | $R_2$ | STANDARD | MP | LP |
| 3 | $R_3$ | STANDARD | ME | SP |
| 4 | $R_4$ | STANDARD | ME | LP |
| 5 | $R_5$ | HIGH QUAL. | MP | SP |
| 6 | $R_6$ | HIGH QUAL. | MP | LP |
| 7 | $R_7$ | HIGH QUAL. | ME | SP |
| 8 | $R_8$ | HIGH QUAL. | ME | LP |

PCM SIGNAL RECORDING APPARATUS

BACKGROUND OF THE INVENTION

1. Field of the Invention

This invention relates generally to an information recording apparatus and, more particularly, is directed to an apparatus suitable for recording digital data on a magnetic recording medium.

2. Description of the Prior Art

Apparatus for recording digital data on a magnetic recording medium is already known, for example, in the form of an 8-mm format video tape recorder (VTR) which is used for recording a PCM audio signal. In such 8-mm format VTR, two rotary magnetic heads are used to record respective slant tracks TRA and TRB, respectively, which are disposed alternately on a magnetic tape 1, as shown on FIG. 11. Further, in the 8-mm format VTR, the audio signals are PCM-encoded, time-based compressed and recorded in a respective portion $TR_{AD}$ of each of the slant tracks TRA and TRB, while the remaining portion $TR_{VD}$ of each of the slant tracks may have a field of the video signal recorded therein. A particular type of modulation used to record the time-compressed, PCM-encoded audio signal is biphase-mark modulation, for example, as described in detail in U.S. Pat. No. 4,551,771, issued Nov. 5, 1985, and having a common assignee herewith.

Figure 12A:
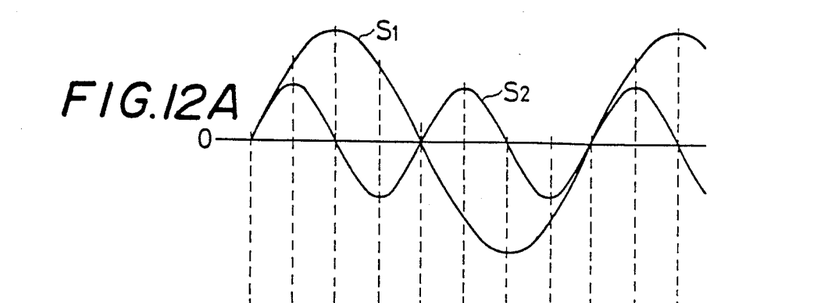
FIGS. 12A, 12B and 12C are waveforms to which reference is made in explaining biphase-mark modulation.

As shown in FIG. 12A, in biphase-mark modulation, frequency signals $S_1$ and $S_2$ having frequencies $f_1$, for example, of 2.9 MHz, and $f_2$, for example, of 5.8 MHz, are recorded as digital data on the magnetic tape while maintaining a phase relationship in which their zero cross points coincide with each other. For example, when a PCM audio signal is at logic "L", the frequency signal $S_1$ having the low frequency $f_1$ is recorded, whereas, when the PCM audio signal is at logic "H", the frequency signal $S_2$ having the high frequency $f_2$ is recorded on the magnetic tape.

Figure 12B:
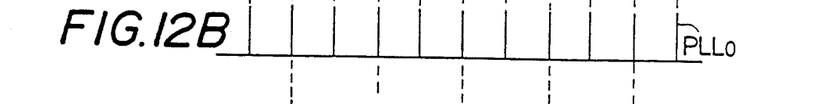
Figure 12C:
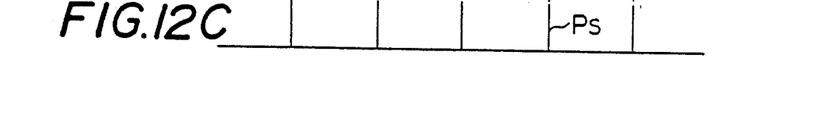

When an audio signal recorded in an audio track portion $TR_{AD}$ is reproduced or played back the zero cross points of the picked-up frequency signal $S_1$ or $S_2$ are detected, as shown in FIG. 12B. In response to such detection, for example, a sampling pulse oscillator with a phase locked loop (PLL) arrangement is made to oscillate and thereby provide output pulses $PLL_O$ which are phase shifted 45 degrees from the frequency signal $S_1$ having the low frequency $f_1$, or phase shifted 90 degrees from the frequency signal $S_2$ having the high frequency $f_2$. Those of the output pulses $PLL_O$ generated at the phase angles of 45 degrees, 135 degrees, 225 degrees, and 315 degrees of the frequency signal $S_1$ are used as sampling pulses $P_S$ (FIG. 12C) for sampling the reproduced data. When every other two of the resulting sampled values are positive, it is determined that the respective playback data is at logic level "L". Further, those of the output pulses $PLL_O$ generated at the 90 degree and 270 degree phase angles of the frequency signal $S_2$ are also used as sampling pulses $P_S$ (FIG. 12C) for sampling the reproduced data and, when every other of these sampled values are positive, it is determined that the respective reproduced data is at logic level "H". The reproducing of biphase-mark modulated data is further described in U.S. patent application Ser. No 115,045, and in the corresponding EPO laid-open publication No. 0264228, which also have a common assignee herewith.

Figure 13:
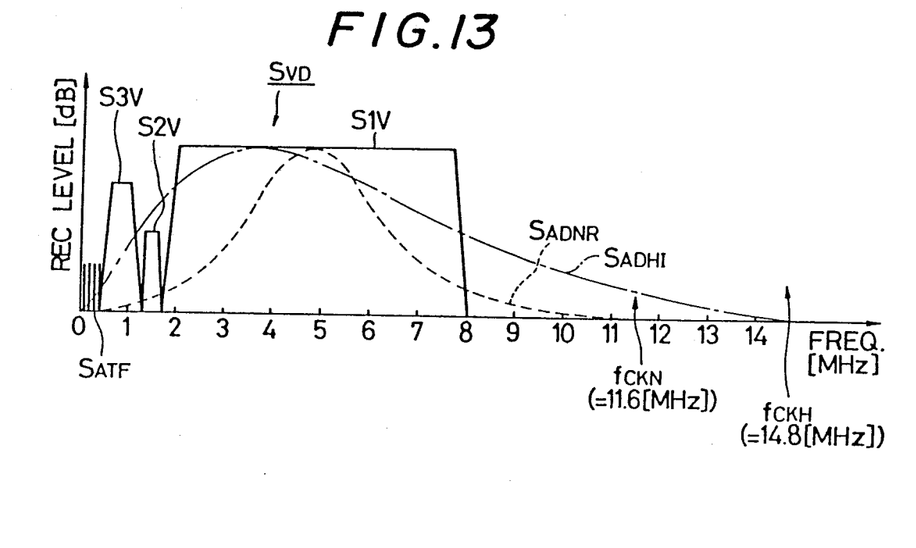
FIG. 13 is a graphic illustration of a recording signal spectrum.

As shown in FIG. 13, the video signal $S_{VD}$ recorded in the video track portion $TR_{VD}$ of each of the tracks TRA and TRB is known to consist of an FM luminance signal S1V, an FM audio signal S2V lower than the signal S1V and a low frequency or down-converted signal S3V. An automatic track follower (ATF) signal $S_{ATF}$ is superposed on the video signal $S_{VD}$ for recording therewith in the video track portion $TR_{VD}$. The same rotary magnetic head used for recording the video signal $S_{VD}$ is also used for recording the PCM audio signal $S_{ADNR}$ in the audio signal portion $TR_{AD}$ of the respective track. The frequency spectrum of the PCM audio signal $S_{ADNR}$ is shown on FIG. 13 to have a peak value at a frequency which substantially coincides with the center frequency of the FM luminance signal S1V. Further, the PCM audio signal $S_{ADNR}$ has a frequency characteristic in which the signal level nears zero in the high and low frequency ranges of the video signal $S_{VD}$. By reason of the foregoing, the same degrees of azimuth loss are obtained when one of the rotary magnetic heads reproduces the video signal $S_{VD}$ and the PCM audio signal $S_{ADNR}$ recorded in respective portions of the same slant track. Therefore, the PCM audio signal $S_{ADNR}$ can be recorded with no guard band between adjacent tracks, and with the two rotary magnetic heads having gaps with different azimuth angles so that the azimuth loss can be relied upon for substantially minimizing cross talk between the PCM audio signals recorded in adjacent tracks.

Depending upon the application thereof, digital data recorded on a magnetic recording medium may have different sampling frequencies. Therefore, recording media of different types are used for recording digital data having respectively different recording densities. If a reproducing or playback apparatus can be adapted for reproducing data from the different types of tapes having respectively different recording densities, the uses of such playback apparatus will be accordingly extended. Thus, for example, it is advantageous to provide an 8-mm VTR capable of use with first and second types of recording media, in which the first type of recording medium records PCM audio data having a standard digital information content sampled at a standard sampling frequency, while the second type of recording medium records PCM audio data having a relatively larger content of high-quality digital data sampled at a frequency that is a predetermined multiple of the standard sampling frequency. If these first and second types of recording media could be reproduced in a common 8-mm VTR, that is, the same apparatus can be used for reproducing a standard-quality audio signal from the first type of recording medium and for reproducing a high-quality audio signal from the second type of recording medium, the 8-mm VTR will be of substantially expanded utility However, if the same recording current is supplied to a magnetic head when recording data on different types of magnetic recording media having different recording densities, the bit error rate may be undesirably increased when the recorded data is reproduced

OBJECTS AND SUMMARY OF THE INVENTION

Accordingly, it is an object of this invention to provide an apparatus for selectively recording data of a relatively low or standard recording density and of a high recording density on a magnetic recording medium so as to permit playback or reproducing of the recorded data with a desirably small bit error rate.

Another object of this invention is to provide a data recording apparatus, as aforesaid, which is capable of achieving the desirably low bit error rate of the reproduced data when the data has been recorded with any selected one of a plurality of speeds of the recording head relative to the magnetic recording medium.

Still another object of this invention is to provide a data recording apparatus, as aforesaid, which is capable of achieving the desirably low bit error rate of the reproduced data when the data is recorded on any one of a plurality of different types of magnetic recording medium, such as, a coated-type magnetic tape or a vapor deposited-type magnetic tape.

In accordance with an aspect of this invention, in an apparatus for recording data on a magnetic recording medium with a selected one of at least first and second recording densities which are different from each other, recording amplifier means is provided for selectively supplying at least first and second digital recording currents suitable for recording the data at the first and second recording densities, respectively, to a magnetic head or heads for recording the data on the magnetic recording medium, and recording current switching control means for controlling the recording amplifier means so as to switch between the first and second recording currents in response to current switching conditions corresponding to the first and second recording densities so that, upon playback of the resulting recorded data, the S/N value thereof, that is, the ratio of the playback carrier signal level to the playback noise level, is increased for maintaining the bit error rate at a desirably low value.

Further, in accordance with a feature of this invention, for each of the different recording densities, the respective recording current supplied to the magnetic head or heads is controlled so as to be a predetermined amount greater than an optimal value of such recording current at a Nyquist frequency of the digital data.

The above, and other objects, features and advantages of this invention, will be apparent in the following detailed description of an embodiment thereof when read in connection with the accompanying drawings, in which corresponding parts or components are identified by the same reference numerals in the several views.

DESCRIPTION OF A PREFERRED EMBODIMENT

Figure 1:
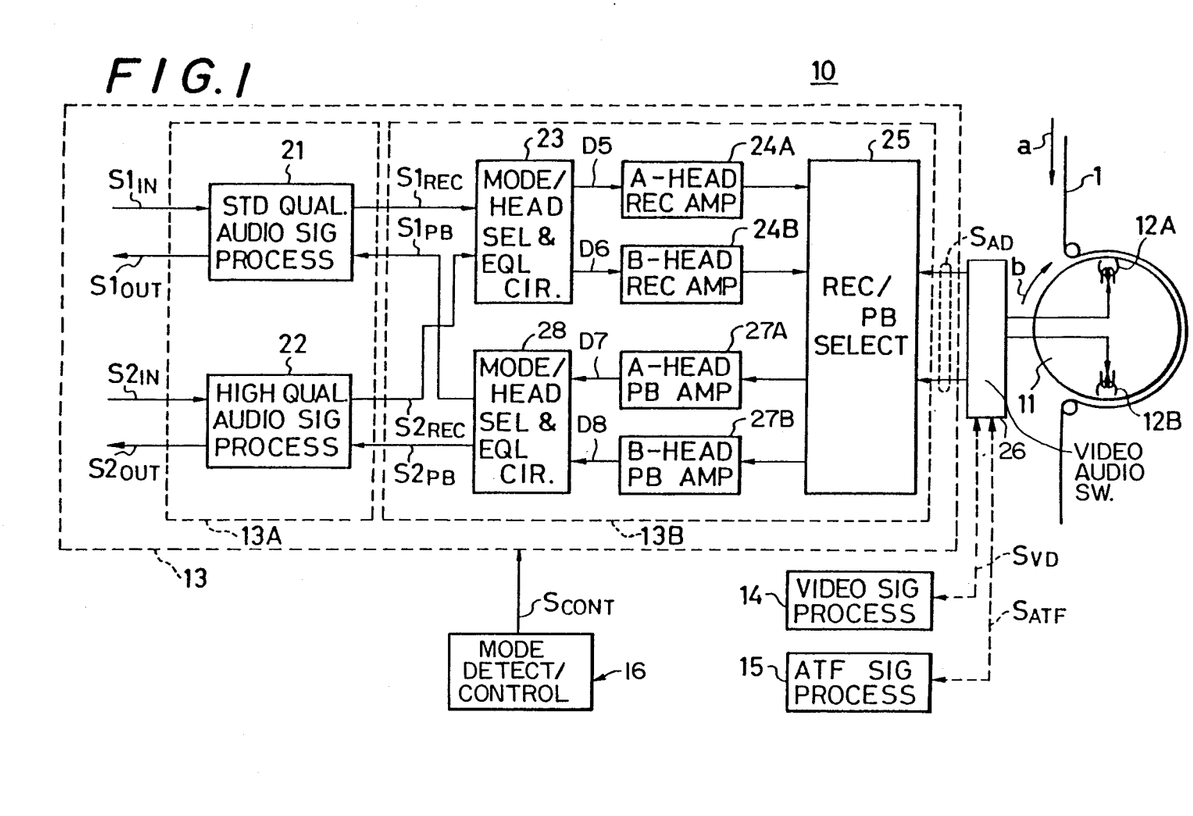
FIG. 1 is a block diagram illustrating a recording/reproducing apparatus according to an embodiment of the present invention.

Referring to the drawings in detail, and initially to FIG. 1 thereof, it will be seen that a data recording/playback apparatus 10 according to an embodiment of this invention is there shown applied to an 8-mm VTR in which a pair of magnetic heads 12A and 12B (hereinafter referred to as the A and B heads) on a rotary drum 11 helically scan a magnetic tape 1 wrapped about the drum. As has been earlier described with reference to FIG. 11, the A and B heads 12A and 12B sequentially and alternately scan slant record tracks TRA and TRB, respectively, which each include of a video track portion $TR_{VD}$ and an audio track portion $TR_{AD}$.

The A and B heads 12A and 12B are connected to a PCM audio signal processing section 13, a video signal processing section 14, an ATF signal processing section 15 for automatic track following and a mode detect/control section 16 through a video/audio switch circuit 26. In a recording mode of the apparatus 10, a video signal $S_{VD}$ and an automatic track following signal $S_{ATF}$ output from the video signal processing section 14 and the ATF signal processing section 15, respectively, are superposed and recorded together in the video track portion $TR_{VD}$ of each slant record track. A PCM audio signal $S_{AD}$ output from the PCM audio signal processing section 13 is recorded in the audio track portion $PR_{AD}$ of each of the slant record tracks.

Figure 11:
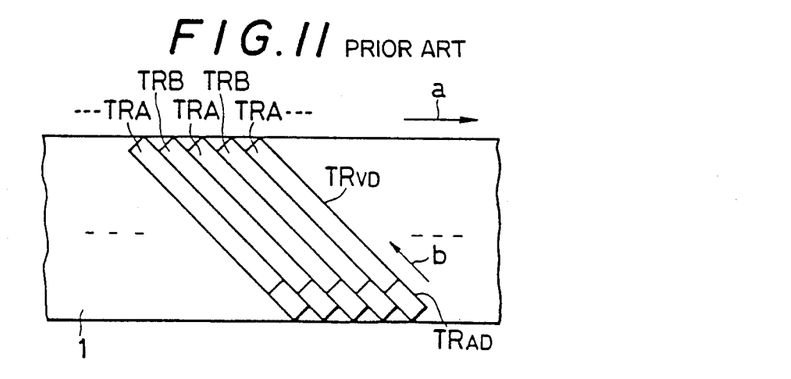
FIG. 11 is a diagrammatic view similar to that of FIG. 10, and to which reference is made in explaining a known recording pattern in which audio and video signals are recorded in respective portions of the same tracks.

The PCM audio signal processing section 13 is shown to include an audio data processing unit 13A and a recording/playback circuit 13B which are controlled by control signals $S_{CONT}$ supplied by a system controller 31 (FIG. 2) included in the mode detect/control section 16. The audio data processing unit 13A is shown on FIG. 1 to include a standard-quality audio signal processing circuit 21 and a high-quality audio signal processing circuit 22. In the recording mode, either recording audio data $S1_{REC}$ formed by the processing circuit 21 in correspondence to an analog audio input signal $S1_{IN}$, or recording audio data $S2_{REC}$ formed by the processing circuit 22 in correspondence to a second audio input signal $S2_{IN}$ are supplied to a mode/head selector and equalizer circuit 23 included in the recording/playback circuit 13B. The mode/head selector circuit 23 selects one of the recording audio data S1$_{REC}$ and S2$_{REC}$ in accordance with the establishment of a standard-quality recording mode or a high-quality recording mode, respectively. The selected data S1$_{REC}$ or S2$_{REC}$ to be recorded in the audio track portions TR$_{AD}$ of the slant tracks TRA and TRB are supplied through an A-head recording amplifier circuit 24A and a B-head recording amplifier circuit 24B, respectively, to a recording/playback selector 25. The selector 25 and the video/audio switch circuit 26 cooperate to sequentially supply the audio data from the A-head recording amplifier circuit 24A and the B-head recording amplifier circuit 24B to the A-head 12A and the B-head 12B, respectively, during suitably timed intervals so as to constitute the audio data S$_{AD}$ recorded in the audio track portions TR$_{AD}$ of the slant tracks TRA and TRB, respectively (FIG. 11). The video/audio switch circuit 26 similarly cooperates with the video signal processing circuit 14 and is suitably timed so that the rotary heads 12A and 12B record the video signal S$_{VD}$ in the video signal portions TR$_{VD}$ of the slant tracks TRA and TRB, respectively.

In the playback or reproducing mode, the video/audio switch circuit 26 and the record/playback selector 25 direct the audio signal S$_{AD}$ reproduced by the A and B heads 12A and 12B from the audio track portions TR$_{AD}$ of the tracks TRA and TRB, respectively, through an A-head playback amplifier 27A and a B-head playback amplifier 27B to a mode/head selector and equalizer circuit 28. The mode/head selector and equalizer circuit 28 selectively fetches the reproduced audio signal from the A-head or B-head playback amplifier 27A or 27B, and performs a predetermined equalizing process thereon in accordance with the established playback mode of the apparatus, that is, whether the apparatus is in its standard-quality playback mode or in its high-quality playback mode. Then, playback audio data S1$_{PB}$ or S2$_{PB}$ is selectively supplied from the circuit 28 to the standard-quality audio signal processing circuit 21 or the high-quality audio signal processing circuit 22, respectively, once again in dependence on the established playback mode of the apparatus. The operative audio signal processing circuit 21 or 22 converts the playback audio data S1$_{PB}$ or S2$_{PB}$, respectively, into analog signals which are output from the circuit 21 or 22 as first or second audio output signals S1$_{OUT}$ or S2$_{OUT}$, respectively.

In the embodiment of the invention being here described, the audio signal processing circuit 21 samples the respective input audio signal S1$_{IN}$ at a standard sampling frequency, for example, a sampling frequency of 2f$_H$=31.5 KHz, for converting the input audio signal S1$_{IN}$ into 10-bit PCM digital data. A CRCC (cyclic redundancy check code) error code is added to such digital data, and the number of bits of the digital data is compressed by 10-8 bit conversion or compression. The 10-8 bit conversion or compression is preferably effected in a non-linear encoder or compressor which effects non-linear quantization for reducing quantizing noise. The resulting compressed data is subjected to biphase-mark modulation at a clock frequency CK$_{NR}$, for example, of 11.6 MHz, for forming the recording audio data S1$_{REC}$ which is output from the circuit 21 and which consists of two frequency signals S$_1$ and S$_2$ (FIG. 12A) which, for example, have the frequencies f$_1$=2.9 MHz and f$_2$=5.8 MHz.

In the standard-quality playback mode, the audio signal processing circuit 21 biphase-mark demodulates the reproduced audio data S1$_{PB}$ and effects error correction by means of the CRCC error code. The circuit 21 further effects interpolation of the audio data and then performs 10-8 inverse conversion, whereupon the resulting data is D/A converted so as to provide the audio output signal S1$_{OUT}$.

It will be appreciated that the audio signal processing circuit 21 is substantially the same as the circuit disclosed in the previously mentioned U.S. Pat. No. 4,551,771.

In the high-quality recording mode of the apparatus 10, the high-quality audio signal processing circuit 22 samples the respective audio input signal S2$_{IN}$ at a high-quality sampling frequency, for example, of 3f$_H$=48 KHz, which is higher then the standard sampling frequency so as to obtain 16-bit PCM digital data. Then, a CIRC (Cross Interleaved Reed-Solomon Code) error code is added to the digital data, whereupon the digital data and the error code added thereto are compressed. The compressed data is then 8/10 modulated and NRZI (non-return to zero inverted) converted at a clock frequency CK$_{HI}$=14.8 MHz (that is, the Nyquist frequency f$_{NYH}$=7.4 MHz), whereby the data is modulated into a data string which is not easily influenced by DC level shift. The converted data string is output from the circuit 22 as the second recording audio data S2$_{REC}$. The foregoing 8/10 modulation of the compressed data is a kind of group coded modulation in which, with N=8 and M=10, the data bits are segmented into N-bit blocks, each N-bit block is converted to an M-bit data string or code, and $2^N$ patterns or codes are selected from the converted $2^M$ patterns or codes for reducing the DC and low frequency components in the frequency spectrum of the modulated signal. A modulation system similar to the foregoing 8/10 modulation is described in detail in the previously mentioned U.S. Pat. No. 4,577,180, and in U.S. Pat. No. 4,617,552, issued Oct. 14, 1986, and also having a common assignee herewith.

In the high-quality playback mode of the apparatus 10, the audio signal processing circuit 22 effects NRZI decoding and 8/10 demodulation of the reproduced audio data S2$_{PB}$ supplied thereto. Further, the demodulated data is subjected to error correction by means of the CIRC error code and, thereafter, the corrected data is subjected to interpolation and then converted to the analog audio signal S2$_{OUT}$ which is output from the circuit 22.

A sampling circuit having a sampling frequency of 48 KHz and a circuit for processing 16-bit PCM digital data, as described above, are available, for example, such circuits may be of the types presently employed in a rotary-head digital audio tape recorder (R-DAT).

Figure 2:
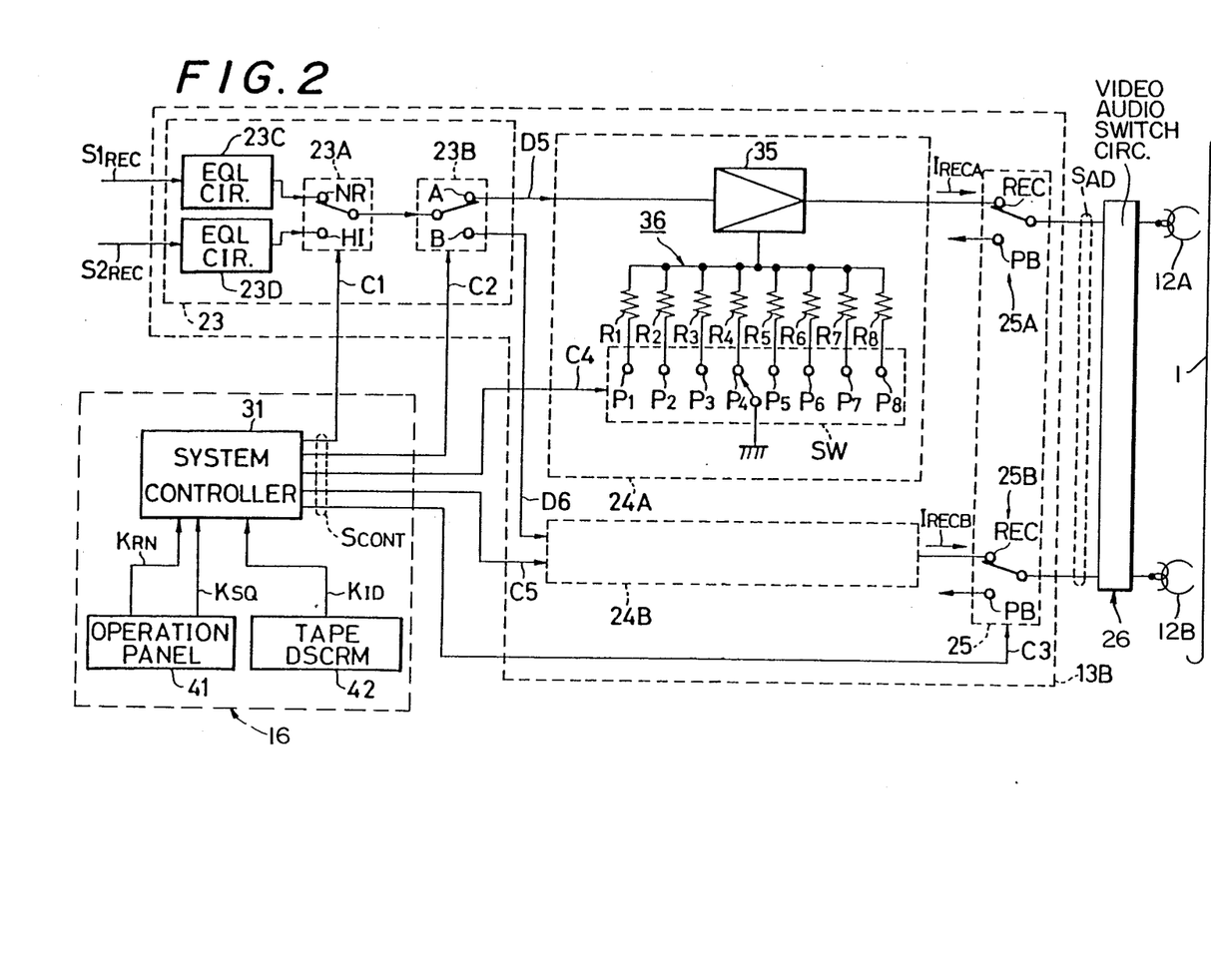
FIG. 2 is a circuit diagram showing details of a recording/reproducing or playback circuit included in the apparatus of FIG. 1.

The recording audio data S1$_{REC}$ and S2$_{REC}$ obtained from the audio signal processing circuits 21 and 22, respectively, are supplied through respective equalizing circuits 23C and 23D to standard-and high-quality input terminals NR and HI, respectively, of a mode selecting switch circuit 23A included in the mode/head selector and equalizer circuit 23, as shown in FIG. 2. The mode selecting switch circuit 23A is controlled by a mode designation or establishing signal C1 included in the control signals S$_{CONT}$ provided by a system controller 31 in the mode detect/control section 16. When the signal C1 designates the standard-quality recording mode, the mode selecting switch circuit 23A engages its input terminal NR, as shown on FIG. 2, so that the audio data S1$_{REC}$, as equalized in the circuit 23C, is supplied through the mode switch circuit 23A to the head switching circuit 23B. On the other hand, when the signal C1 designates the high-quality recording mode, the mode switching circuit 23A engages its terminal HI, so that the audio data S2$_{REC}$, as equalized in the circuit 23D, is supplied through the mode switch circuit 23A to the head switching circuit 23B. The head switching circuit 23B is controlled or changed-over so as to alternately engage its output terminals A and B by a head switching signal C2 included in the control signals S$_{CONT}$ from the system controller 31. Thus, the audio data supplied to the head switching circuit 23B is output from the terminal A or B thereof as recording data D5 or D6, respectively.

The recording data D5 is amplified by the A-head recording amplifier circuit 24A and supplied, as a recording current I$_{RECA}$ to a terminal REC of a record/playback switch 25A of the selector 25. The output of the record/playback switch 25A which constitutes a portion of the audio signal S$_{AD}$, is supplied through the video/audio switch circuit 26 to the A-head 12A. Similarly, the recording data D6 from terminal B of head switch circuit 23B is amplified by the B-head recording amplifier circuit 24B and then applied to a terminal REC of a record/playback switch circuit 25B of the selector 25. The output of the record/playback switch 25B which constitutes the portion of the audio signal S$_{AD}$ to be recorded by the B-head 12B is supplied to the latter through the video/audio switch circuit 26. The record/playback switch circuits 25A and 25B are controlled by a record/playback control signal C3 included in the control signals S$_{CONT}$ from the system controller 31 so that the switch circuits 25A and 25B engage their respective REC terminals, as shown on FIG. 2, when the apparatus is in a recording mode, and so that switch circuits 25A and 25B are changed-over to engage respective terminals PB when the apparatus is in a reproducing or playback mode.

In accordance with the present invention, the recording amplifier circuits 24A and 24B are capable of supplying the recording data D5 and D6 in the form of selectively variable, amplified recording currents I$_{RECA}$ and I$_{RECB}$, respectively, for recording by the heads 12A and 12B. As shown in FIG. 2 in respect to the recording amplifier circuit 24A, each of the recording amplifier circuits 24A and 24B includes a recording amplifier 35 for generating the recording current I$_{RECA}$ or I$_{RECB}$, and a circuit 36 connected with the respective amplifier 35 for selectively varying the recording current by changing the degree of current amplification effected by the respective recording amplifier 35.

More specifically, in the illustrated embodiment, the circuit 36 provides a changeable bias resistance for the respective amplifier 35 and is shown to include 8 bias resistors R$_1$, R$_2$, R$_3$,-R$_8$ connected in common, at one end, to the respective recording amplifier 35, and being selectively connected, at their other ends, to ground for inclusion in a bias resistance circuit of the amplifier 35. More specifically, the other ends of the bias resistors R$_1$, R$_2$, R$_3$,-R$_8$ are shown to be connected to contacts P$_1$, P$_2$, P$_3$,-P$_8$, respectively, of a switching circuit SW which further has a movable contact connected to ground and being selectively engagable with the fixed contacts P$_1$, P$_2$, P$_3$, -P$_8$ for determining the bias resistance of the respective amplifier 35. The bias resistance selecting switches SW of the recording amplifier circuits 24A and 24B are respectively controlled by recording current control signals C$_4$ and C$_5$ included in the control signals S$_{CONT}$ from the system controller 31. It will be appreciated that, in response to the signal C4, the switch circuit SW of the recording amplifier circuit 24A grounds a selected one of its contacts P$_1$-P$_8$ and, as a result thereof, the recording current I$_{RECA}$ output from the respective amplifier 35 has a level or amplitude determined by the resistance of the one of the bias resistors R$_1$-R$_8$ connected to the grounded contact of the switch circuit SW. Similarly, the level or amplitude of the recording current I$_{RECB}$ provided by the amplifier 35 of the recording amplifier circuit 24B is determined by the resistance of the one of the bias resistors connected to ground through the respective switch circuit SW in accordance with the C5.

In the standard-quality recording mode, the A and be heads 12A and 12B record the audio signal S$_{AD}$ on the magnetic tape 1 with a standard recording density, for example, 8-bit, 39 kBPI, whereas, in a high-quality recording mode, the heads 12A and 12B record the audio signal S$_{AD}$ with a recording density higher than the standard recording density, for example, 16-bit, 80 kBPI. In accordance with the embodiment of the invention described above, the system controller 31 determines the control signals C4 and C5 for controlling the switch circuits SW of the recording amplifier circuits 24A and 24B, respectively, so as to select one of the bias resistors R$_1$-R$_8$ of the respective bias resistance circuit 36 in accordance with the recording current determining conditions shown on FIG. 3.

As shown, one of the recording current determining conditions is the quality of the audio signal S$_{AD}$ to be recorded on the magnetic tape, that is, whether standard-quality or high-quality recording of the audio signal is to be effected. As shown on FIG. 2, a user of the apparatus 10 suitably actuates a key or keys on an operation panel 41 so as to provide to the system controller 31 a recording quality setting signal K$_{SQ}$ which establishes a standard-quality recording mode or a high-quality recording mode prior to the initiation of a recording operation of the apparatus.

When the standard-quality recording mode is established, the recording audio data S1$_{REC}$ from the standard-quality audio signal processing circuit 21 is selected by the mode/head selector and equalizing circuit 23 and is supplied to the A and B heads 12A and 12B, alternately, through the recording amplifier circuits 24A and 24B, respectively, and the record/playback selector 25. As a result, a standard PCM audio signal S$_{ANDR}$ having the frequency spectrum indicated by the broken line on FIG. 13 is recorded on the magnetic tape 1. Such standard PCM audio signal S$_{ANDR}$ is biphase-mark modulated at frequency f$_1$=2.9 MHz and f$_2$=5.8 MHz. Thus, the signal S$_{ANDR}$ exhibits a frequency spectrum which has a peak at a frequency substantially coinciding with the center frequency of the FM luminance signal S1V of the video signal S$_{VD}$, and is within the range of the clock frequency f$_{CKN}$=2 f$_2$=11.6 MHz.

On the other hand, when the high-quality recording mode is selected in response to the corresponding recording quality setting signal K$_{SQ}$ provided from the operation panel 41 to the system controller 31, recording audio data S2$_{REC}$ from the high-quality signal processing circuit 22 is selected by the mode/head selector and equalizing circuit 23 and is supplied alternately to the heads 12A and 12B through the recording amplifier circuits 24A and 24B, respectively, and the recording/playback selector 25. In this case, a high-quality PCM audio signal S$_{ADHI}$ having the frequency spectrum indicated by the dot-dash curve on FIG. 13 is recorded on the magnetic tape 1. Such high-quality PCM audio signal $S_{ADHI}$ is 8/10-modulated at the Nyquist frequency $f_{NYH}=7.4$ MHz, and is thereafter NRZI-modulated. Thus, the signal $S_{ADHI}$ exhibits a frequency spectrum having a peak frequency near to the peak frequency of the standard-quality PCM audio signal $S_{ADNR}$, and is within the range of the clock frequency $f_{CKH}=2 f_{NYH}=14.8$ MHz. Thus, when the high-quality recording mode is selected, a digital signal having a recording density higher than the standard recording density is recorded on the magnetic tape 1.

In addition to having peak values at frequencies near to the center frequency of the FM luminance signal S1V of the video signal $S_{VD}$, the standard- and high-quality PCM audio signals $S_{ADNR}$ and $S_{ADHI}$ are shown to have frequency spectrum which are reduced to zero within the ranges of the clock frequencies $f_{CKN}$ and $f_{CKH}$, respectively. Therefore, these standard- and high-quality PCM audio signals can be recorded in the audio track portions $TR_{AD}$ of the adjacent tracks TRA and TRB provided on the magnetic tape 1 without guard bands therebetween, and with the heads 12A and 12B having gaps with different azimuth angles for avoiding cross talk.

However, it has been experimentally demonstrated that, when the standard and high-quality PCM audio signals $S_{ADNR}$ and $S_{ADHI}$ having the frequency spectrum shown in FIG. 13 are recorded on a magnetic tape, the relationship of the S/N ratio, that is, the ratio of the playback carrier signal level to the playback noise level, to the recording current $I_{REC}$ is different for the standard-quality and high-quality PCM audio signals, respectively. For example, such relationships for the standard- and high-quality PCM audio signals $S_{ADNR}$ and $S_{ADHI}$, respectively, are substantially represented by the curves $BE_{NR}$ and $BE_{HI}$, respectively, on FIG. 4. For both the standard- and high-quality PCM audio signals $S_{ADNR}$ and $S_{ADHI}$, as the recording currents $I_{REC}$ are increased from zero, the corresponding S/N ratios increase to attain peak values at the recording currents $I_{RECNR}$ and $I_{RECHI}$, respectively. Beyond such peak values, the S/N ratios decrease as the recording currents $I_{REC}$ increase. In general, the curve $BE_{HI}$ for high-quality recording has lower values of S/N ratios than the curve $BE_{NR}$ for standard-quality recording. Further, the recording current $I_{RECHI}$ corresponding to the peak value of the curve $BE_{HI}$ for high-quality recording is lower than the recording current $I_{RECNR}$ corresponding to the peak value of the curve $BE_{NR}$ for the standard-quality recording.

Figure 4:
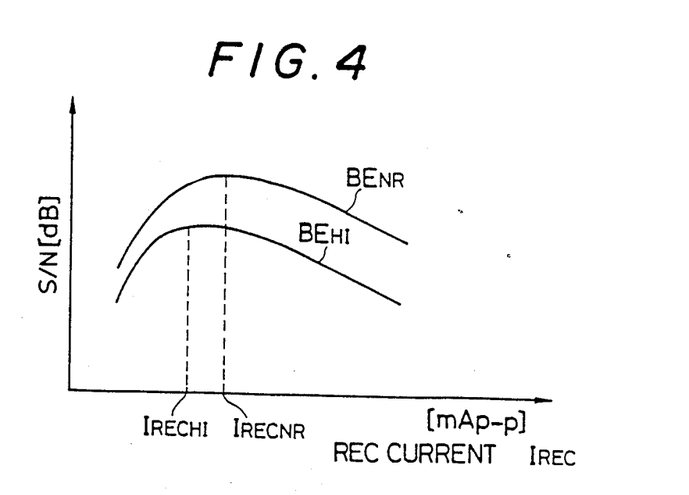
FIG. 4 is a graph showing the relationship between the recording current and the S/N ratio when recording is performed with different recording densities.
Figure 5:
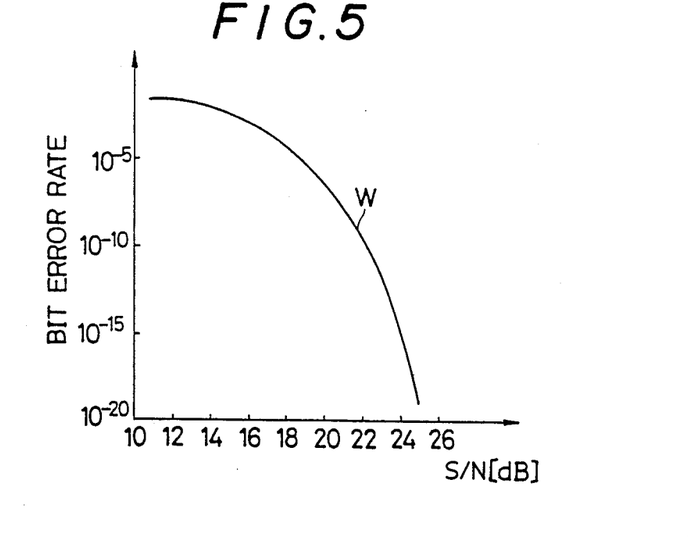
FIG. 5 is a graph showing the relationship between the S/N ratio and the bit error rate.

In general, and as shown on FIG. 5, the bit error rate of the playback data decreases as the value of the S/N ratio increases. Therefore, when the standard-quality PCM audio signal $S_{ADNR}$ is being recorded the recording current $I_{REC}$ is desirably adjusted to the current value $I_{RECNR}$ corresponding to the peak value of the ratio S/N given by the curve $BE_{NR}$ on FIG. 4 so that, when the audio signal thus recorded on the magnetic tape is reproduced, the playback data will have a minimum bit error rate, as indicated in FIG. 5. On the other hand, when a high-quality PCM audio signal $S_{ADHI}$ is being recorded, the recording current is desirably set to the current value $I_{RECHI}$ corresponding to the peak value of the ratio S/N given by the curve $BE_{HI}$ on FIG. 4, so that, when the thus recorded audio signal is reproduced from the magnetic tape, the playback audio data will again have a minimum bit error rate.

Figure 3:
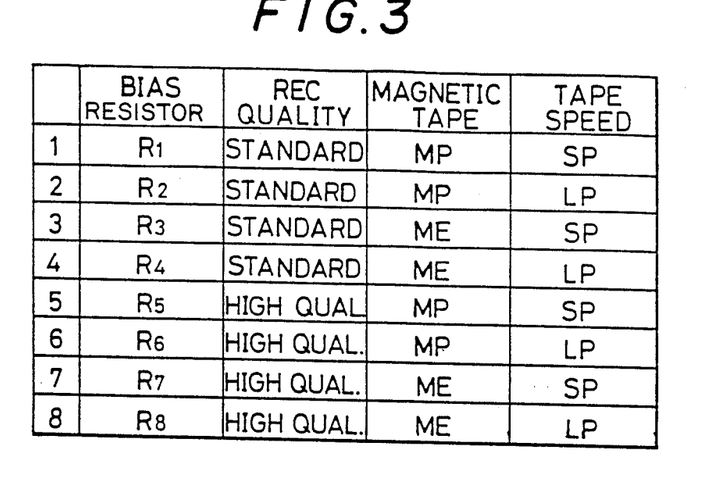
FIG. 3 is a table showing recording current switching conditions for the recording/reproducing circuit of FIG. 2.

In accordance with the foregoing, the system controller 31 responds to whether a standard-quality audio signal or a high-quality audio signal is to be recorded, as indicated by the recording quality setting signal $K_{SQ}$, for determining the bias resistance selecting signals C4 and C5 so as to select an appropriate one of the bias resistances $R_1$-$R_4$, in the case of standard-quality recording, or an appropriate one of the bias resistances $R_5$-$R_8$, in the case of high-quality recording, as shown on FIG. 3. Thus, the recording current in each instance, is variably determined for achieving a minimum bit error rate of the recorded standard-quality or high-quality PCM audio signal.

Further, the recording current is variably determined in accordance with type of the magnetic tape employed, that is, whether the signals are being recorded on a coated-type of magnetic tape, hereinafter referred to an MP magnetic tape, or on a vapor deposited-type magnetic tape, hereinafter referred to as an ME magnetic tape.

Figures 6, 7:
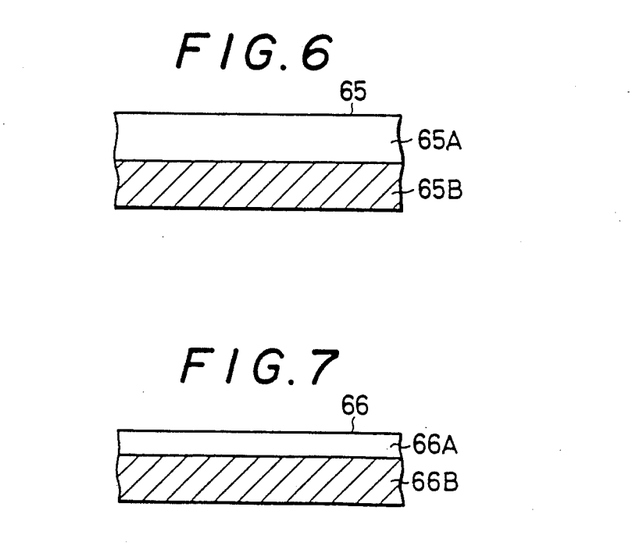
FIGS. 6 and 7 are fragmentary sectional views showing a coated-type magnetic tape and vapor deposited-type magnetic tape, respectively.
Figure 8:
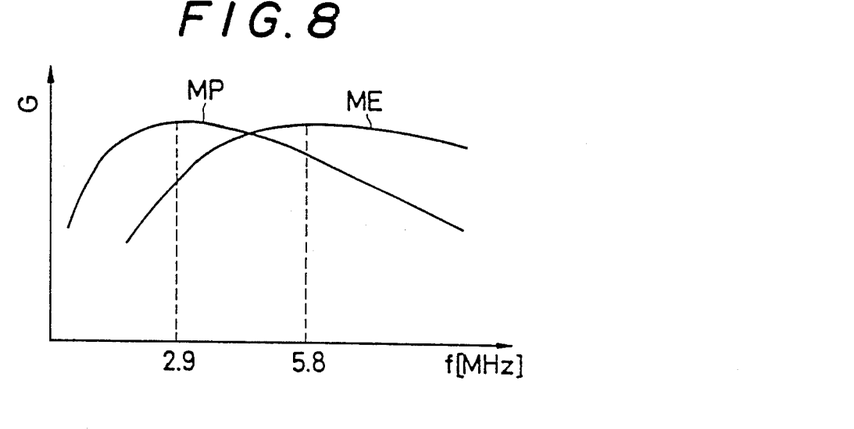
FIG. 8 is a graph showing amplitude-frequency characteristics of the tapes illustrated in FIGS. 6 and 7.

More specifically, and as shown on FIG. 6, a coated-type or MP magnetic tape 65 is produced by coating a magnetic layer 65A on a suitable base 65B. The frequency characteristic of such tape has a peak near the frequency $f_1=2.9$ MHz, as indicated by the curve MP on FIG. 8. The frequency characteristic, that is, the level of a signal reproduced from the magnetic tape MP relative to the level of the signal recorded thereon, decreases as the frequency of such signal is increased or decreased in respect to the frequency of 2.9 MHz.

In the case of a vapor deposited-type or ME magnetic tape 66, as shown on FIG. 7, a magnetic layer 66A is evaporated or sputtered on a base 66B. Since the magnetic layer 66A of such tape has a small thickness, a high-frequency signal component may often punch through the magnetic layer 66A during recording. For this reason, the frequency characteristic of the magnetic tape ME has a peak level near the high frequency $f_2=5.8$ MHz, as indicated by the curve ME on FIG. 8, and such frequency characteristic curve bends downwardly at frequencies above and below the frequency of 5.8 MHz.

Further, since the magnetic layer 65A of the MP magnetic tape 65 is coated on the base 65B, an axis of easy magnetization is not typically formed on the surface of the magnetic tape 65. In contrast to the foregoing, since the ME magnetic tape 66 has its magnetic layer 66A vapor deposited on the base 66B by a typically obliquely directed sputtering operation, the axis of easy magnetization tends to be formed on the surface of the magnetic tape 66.

Figure 9:
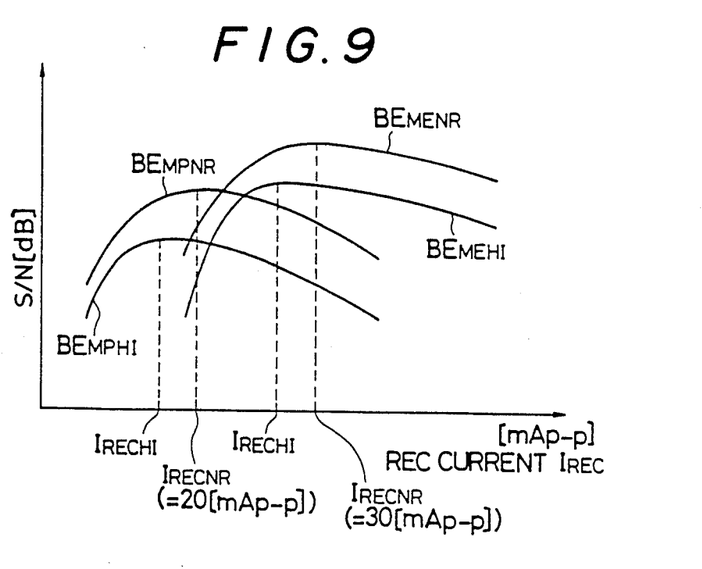
FIG. 9 is a graph showing the relationship between the recording current and the S/N ratio when a difference in recording quality, that is, recording densities, and a difference in the type of magnetic tape used for recording are used as recording current switching conditions.

Referring now to FIG. 9 which shows the relationship between the recording current $I_{REC}$ and the S/N ratio similarly to FIG. 4, it will be seen that the characteristic curves $BE_{MENR}$ and $BE_{MEHI}$ are obtained when a standard-quality PCM audio signal and a high-quality PCM audio signal, respectively, are recorded on ME magnetic tapes. Further, on FIG. 9, the characteristic curves $BE_{MPNR}$ and $BE_{MPHI}$ are obtained when the standard-quality PCM audio signal and the high-quality PCM audio signal, respectively, are recorded on MP magnetic tapes. It will be evident from FIG. 9 that the recording current $I_{RECHI}$ corresponding to a maximum value of S/N ratio when data is recorded in the high-quality recording mode on the MP magnetic tape 65, the recording current $I_{RECNR}$ corresponding to a maximum value of the S/N ratio obtained when data is recorded in the standard-quality recording mode on an MP magnetic tape 65, the recording current $I_{RECHI}$ corresponding to a maximum value of the S/N ratio obtained when data is recorded in the high-quality recording mode on the ME magnetic tape 66, and the recording current $I_{RECNR}$ corresponding to a maximum value of the S/N ratio obtained when data is recorded in the standard-quality recording mode on an ME magnetic tape 66 are all different from each other. Thus, the system controller 31 further determines the bias resistance control signals C4 and C5 in accordance with the type of magnetic tape being used for recording as indicated by a tape indicating signal $K_{ID}$ from a tape discriminator 42 (FIG. 2). More specifically, and as shown on FIG. 3, the controller 31 determines the signals C4 and C5 for selecting one of the bias resistors $R_1$, $R_2$, $R_5$ and $R_6$ when an MP or coated-type magnetic tape is used, and for selecting one of the bias resistors $R_3$, $R_4$, $R_7$ and $R_8$ when an ME or vapor-deposited magnetic tape is used. By way of example, in the present embodiment, the magnetic tape 1 is contained in a cassette and, when such cassette is loaded into the VTR, the tape discriminator 42 senses a conventional ID hole or aperature preformed in the cassette housing so as to indicate whether the magnetic tape contained in such cassette housing is an MP or ME magnetic tape.

Further, in the illustrated embodiment of this invention, the recording currents $I_{RECA}$ and $I_{RECB}$ issuing from the recording amplifier circuits 24A and 24B and being supplied to the magnetic heads 12A and 12B, respectively, are changed in accordance with changes in the speed of the heads 12A and 12B relative to the tape 1, in addition to the previously described changes in the recording current for different recording modes and different types of magnetic tape. More specifically, the apparatus 10 embodying this invention can be operated in a standard playback or SP mode in which the magnetic tape 1 travels at a standard playback speed, or in a long-playback or LP mode in which the magnetic tape travels at a relatively slower speed. As a result of the foregoing, the apparatus 10 has increased compatability with a variety of magnetic recording media. However, when the speed of the magnetic tape is changed, the scanning direction of the heads 12A and 12B with respect to the axis of easy magnetization formed on the magnetic tape 1 is correspondingly changed, and this influences the frequency characteristics of the playback data D7 and D8 (FIG. 1).

Figure 10:
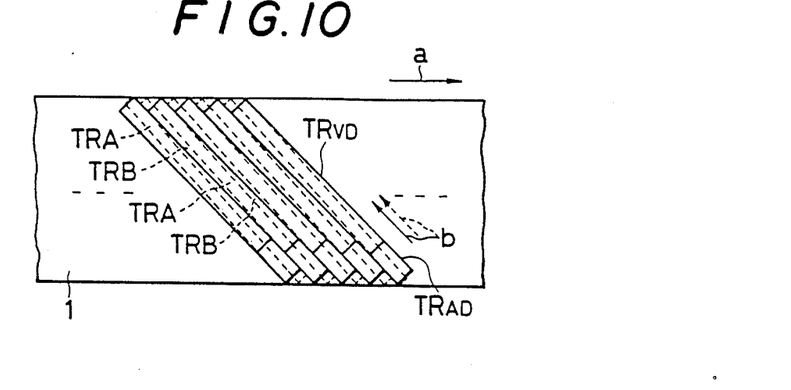
FIG. 10 is a diagrammatic view showing a length of magnetic recording tape and illustrating record track patterns formed on the tape at different tape speeds.

More specifically, and as shown on FIG. 10, the recording tracks TRA and TRB formed by the heads 12A and 12B when the magnetic tape 1 is being moved at a relatively low speed in the LP mode, as indicated by broken lines in FIG. 10, extend in a direction that is angularly displaced from the direction of the recording tracks TRA and TRB formed by the heads 12A and 12B when the tape is moved at a relatively high speed in the SP mode, and which are indicated by solid lines. Therefore, the angular relation of the recording tracks TRA and TRB to the axis of easy magnetization is different for the SP and LP modes, with the result that the data recorded and reproduced from the magnetic tape is influenced by a change in the tape speed.

In the illustrated embodiment of the invention, the user of the apparatus 10 actuates a suitable key or the like on the operation panel 41 (FIG. 2) for setting the tape speed to be employed, and a corresponding tape speed setting signal $K_{RN}$ is supplied to the system controller 31. In response to such tape speed setting signal $K_{RN}$, the system controller 31 determines the bias resistance control signals C4 and C5 for selecting one of the bias resistors $R_1$, $R_3$, $R_5$ and $R_7$ when the selected tape speed corresponds to the standard playback or SP mode, or for selecting one of the bias resistors $R_2$, $R_4$, $R_6$ and $R_8$ when the selected tape speed corresponds to the long-playback or LP mode, as shown on FIG. 3. Thus, when the tape speed is changed, a corresponding change is effected in the recording current so as to achieve the recording of the audio signal on the magnetic tape with a value of the S/N ratio which minimizes the bit error rate of the playback data.

It will be apparent that, with the above described embodiment of the invention, when the user of the apparatus 10 loads a magnetic tape 1 into the VTR in the recording mode, the type of magnetic tape is automatically sensed by the tape discriminator 42 and is input to the system controller 31 as the tape indicating signal $K_{ID}$. Further, prior to the commencement of a recording operation, the user sets or establishes the tape speed to be employed, that is, selects either the SP mode or the LP mode, and also establishes whether recording is to be effected in the standard-quality mode or the high-quality mode by suitable actuations of the operation panel 41 which thereby supplies a corresponding tape speed setting signal $K_{RN}$ and recording quality setting signal $K_{SQ}$ to the system controller 31. In response to the signals $K_{ID}$, $K_{RN}$ and $K_{SQ}$, the system controller 31 selects a corresponding one of the recording current switching conditions represented by the lines identified as (1)-(8) on FIG. 3 and determines the bias resistance selecting signals C4 and C5 for connecting a corresponding one of the bias resistors $R_1$-$R_8$ to the recording amplifier 35 in the recording amplifier circuits 24A and 24B, respectively. In other words, one of the bias resistors $R_1$-$R_8$ is selected in accordance with whether recording quality setting signal $K_{SQ}$ corresponds to the standard- or high-quality recording mode, whether the tape indicating signal $K_{ID}$ corresponds to the MP or ME magnetic tape, and whether the tape speed setting signal $K_{RN}$ corresponds to the tape speed for the LP or the SP mode. Of course, the operation panel 41 may also be provided with a key pad actuable by the user for providing a control signal to the system controller 31 by which one of the bias resistors $R_1$-$R_8$ is directly manually selected.

It will be appreciated that, in all instances, the recording amplifier 35 of each of the recording amplifier circuits 24A and 24B is controlled so that the recording currents $I_{RECA}$ and $I_{RECB}$ have values suitable for ensuring that, when the resulting recorded signal is played back, the value of the S/N ratio of the playback data will correspond to the minimum bit error rate.

By way of example, if the user of the apparatus 10 installs a cassette containing an MP magnetic tape and actuates the operation panel 41 for establishing the high-quality recording mode and the standard playback or SP tape speed, the controller 31 responds to the respective signals $K_{SQ}$, $K_{ID}$ and $K_{RN}$ by determining the control signals C4 and C5 for connecting the bias resistor $R_5$ to the recording amplifier 35 in each of the recording amplifier circuits 24A and 24B, as indicated in line (5) on FIG. 3. In the foregoing case, the recording currents $I_{RECA}$ and $I_{RECB}$ output from the recording amplifier 35 of each of the circuits 24A and 24B corresponds to the recording current $I_{RECHI}$ for the peak level of the curve $BE_{MPHI}$ on FIG. 9. Therefore, and as has been described above with reference to FIG. 5, the PCM audio signal can be recorded on the magnetic tape under conditions that ensure that, upon reproducing or playback of the audio signal, the bit error rate thereof will be sufficiently low for practical use.

In the described embodiment, the tape speed of the magnetic tape is changeable between two specific speeds, that is, a standard tape speed corresponding to the standard or SP mode and a relatively slower tape speed corresponding to the long playback or LP mode. However, if desired, suitably varied recording currents $I_{RECA}$ and $I_{RECB}$ may be generated for minimizing the bit error rates in connection with a variable speed playback mode in which the magnetic tape may be driven at speeds ranging from the normal or standard tape speed up to a speed several times the normal speed. In this case, as before, the recording current is controlled so as to ensure that a minimum bit error rate is obtained for playback data that was recorded at any of the tape speeds within the possible range thereof.

Further, in the specifically described embodiment of the invention, biphase-mark modulation and 8-10 modulation have been described in connection with the recording of digital data having different recording densities, that is, the standard-quality and high-quality recording modes. However, the present invention can be similarly applied to any other types of modulation that provide digital data with different recording densities to be selectively recorded by the apparatus. Furthermore, although magnetic tape is used as the magnetic recording medium in the specifically described embodiment of this invention, it will be apparent that the invention can be similarly applied to other magnetic recording media, such as, a magnetic disk or the like.

It will also be appreciated that, although the invention has been specifically described as applied to the recording of a PCM audio signal in the 8-mm VTR format, that is, the recording of the audio signal in portions $TR_{AD}$ of the slant tracks TRA and TRB which have video signals recorded in other portions $TR_{VD}$ thereof, the invention is not so limited and can be applied to any other recording/reproducing apparatus in which digital signals having different recording densities are to be recorded on, and reproduced from magnetic recording media while maintaining compatability.

Although the illustrated embodiment of the invention employs bias resistors $R_1$–$R_8$ which are selectively connected to the recording amplifier 35 for varying the recording currents as required in accordance with the various recording current switching conditions, such as, the type of magnetic tape, the quality of the recording mode and the tape speed, it is apparent that other arrangements, such as, for example, variable resistors, can be employed for suitably changing the recording currents flowing through the magnetic heads 12A and 12B.

In providing a magnetic recording/playback apparatus for recording/playback of digital data on different types of magnetic recording media, it was proposed to employ a recording current of a value corresponding to a maximum value of the S/N ratio of the playback signal at a Nyquist frequency, that is, a frequency ½ the clock frequency of the data to be recorded. Since the Nyquist frequency represents a maximum frequency of a base-band signal component forming data to be recorded, it was assumed that, when the optimal recording current value is selected to maximize the S/N ratio, the bit error rate will be minimized accordingly. The foregoing assumption was based on the fact that, in an ordinary magnetic recording/playback or reproducing apparatus the value of the S/N ratio of the reproduced or playback signal is degraded with an increase in the frequency thereof. However, it has been experimentally established that, even if the recording current is selected to be an optimal value, that is, a value corresponding to the maximum S/N ratio of the playback signal at the Nyquist frequency, the bit error rate is not minimized, particularly when such optimal value of the recording current is employed for recording on different types of magnetic recording media.

Accordingly, it is another feature of this invention to provide a data recording/playback apparatus which can further improve the bit error rate of the reproduced data when different types of magnetic recording media are used. In consideration of the foregoing, the bit error rate was measured upon the playback of a biphase-mark modulated standard-quality PCM audio signal which was recorded on an MP magnetic tape using, as the recording current therefor, an optimal recording current value $I_{RECOPT}$ at the Nyquist frequency $F_{NYN}$. The recording current was varied from the optimal value thereof considered as a reference value (=0 dB), and it was found that the bit error rate had a minimum value characteristic curve, as at $K_{MPNR}$ on FIG. 14, indicating that, as the recording current $I_{REC}$ was increased beyond the optimal value $I_{RECOPT}$, the bit error rate was decreased up to a value indicated at $I_{RECPCM}$, and thereafter the bit error rate was increased with further increases in the recording current. Similarly, an 8/10-modulated high-quality PCM audio signal was recorded on an MP magnetic tape using the recording current having an optimal value $I_{RECOPT}$ at the Nyquist frequency $f_{NYH}$, and the bit error rate was measured when the recorded audio signal was played back or reproduced. Further, the recording current $I_{REC}$ was again varied relative to the value $I_{RECOPT}$ as a reference value (=0 dB), and it was again found that the bit error rate had a minimum value characteristic curve in which the bit error rate was decreased with increases in the recording current beyond the optimum value up to the value $I_{RECPCM}$, and, for further increases in the recording current, the bit error rate was correspondingly increased, as indicated by the curve $K_{MPHI}$ in FIG. 14.

Figure 14:
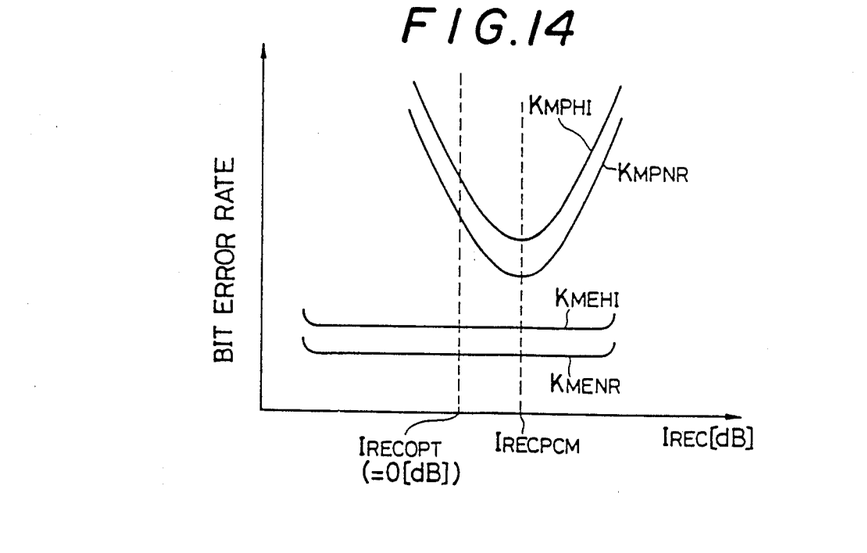
FIG. 14 is a graph showing the relation of the bit error rate to the recording current and to which reference will be made in explaining the control of the recording current for further reducing the bit error rate.

In view of the foregoing characteristic for both the standard- and high-quality PCM audio signals, the bit error rate can be reduced by selecting as the recording current a value thereof that is a predetermined amount greater than the optimal recording current $I_{RECOPT}$ at the Nyquist frequency $f_{NYN}$ or $f_{NYH}$. As distinguished from the foregoing, it was found that, when similar experiments were repeated with an ME magnetic tape, the bit error rate showed substantially little or no change, for example, as indicated by the curves $K_{MENR}$ and $K_{MEHI}$ on FIG. 14, for different recording currents over the range thereof used in obtaining the curves $K_{MPNR}$ and $K_{MPHI}$ for the MP magnetic tape. Based on the foregoing, in the illustrated embodiment of this invention, the bias resistors $R_3$, $R_4$, $R_7$ and $R_8$ (FIG. 2) are provided with resistance values such that the corresponding recording currents provided by the recording amplifier circuits 24A and 24B have the optimal recording current value $I_{RECOPT}$ at the Nyquist frequency $f_{NYN}$ or $f_{NYH}$ when the ME magnetic tape is employed in the standard- or high-quality recording mode. On the other hand, the bias resistors $R_1$, $R_2$, $R_5$ and $R_6$ are provided with resistance values selected so that the respective recording currents are larger by a predetermined amount, that is, from 0.5 to 3.0 dB, than the optimal recording current $I_{RECOPT}$ at the Nyquist frequency $f_{NYN}$ or $f_{NYH}$ when the MP magnetic tape is used in the standard- or high-quality recording mode, respectively. In this connection, it has been experimentally determined that, when the recording current is increased within the range of 0.5 to 3.0 dB above the optimal recording value, for example, to the current value $I_{RECPCM}$, as indicated in FIG. 14, the bit error rate is further reduced below the bit error rate realized with the optimal recording current value $I_{RECOPT}$.

Although an illustrative embodiment of the present invention, and various modifications thereof, have been described in detail herein with reference to the accompanying drawings, it is to be understood that the invention is not limited to that precise embodiment and the described modifications, and that various changes and further modifications may be effected therein by one skilled in the art without departing from the scope or spirit of the invention as defined in the appended claims.

What is claimed is:

1. An apparatus for recording an analog video information signal and a digital audio information signal in parallel adjacent tracks on a magnetic recording medium, the analog video information signal including frequency modulated signal components having a predetermined frequency spectrum, and the digital audio information signal consisting of components having a peak in the frequency spectrum of the analog video information signal, said apparatus comprising:
at least a pair of rotary magnetic heads having air gaps with different azimuth angles for tracing the parallel adjacent tracks on said magnetic recording medium;
first and second recording signal forming circuits selectively operative for forming the digital audio information signal, said first recording signal forming circuit forming a recording signal having a standard recording density for a standard quality recording and further having a central spectrum component substantially the same as a recordable frequency spectrum component of said frequency-modulated analog video information signal, and said second recording signal forming circuit forming a recording signal having a recording density higher than said standard recording density for a higher quality recording and further having a central spectrum component in a frequency band lower than the frequency band of said central spectrum component of said recording signal having the standard recording density;
recording amplifier means for supplying the recording signal from a selected one of said first and second recording signal forming circuits to said pair of rotary magnetic heads with a recording current which is selectively variable; and
means for selectively varying said recording current from said recording amplifier means depending on whether said recording signal is selected from said first or second recording signal forming circuit so as to have said standard recording density or the higher recording density, respectively.

2. An apparatus according to claim 1; wherein the recording signal formed by said first recording signal forming circuit is a signal modulated by biphase-mark modulation so that binary states "1" and "0" of a digital signal correspond to different frequency components.

3. An apparatus according to claim 1; wherein said second recording signal forming circuit effects group coded modulation of the respective recording signal in which data bits are segmented into N-bit blocks, each N-bit block is converted to an M-bit data string, and $2^N$ patterns are selected from converted $2^M$ patterns.

4. An apparatus according to claim 3; wherein N is 8 bits and M is 10 bits.

5. An apparatus according to claim 1; wherein said magnetic recording medium may be any one of a plurality of different types, and said means for selectively varying said recording current includes means for changing the degree of current amplification by said recording amplifier means in accordance with the type of said magnetic recording medium.

6. An apparatus according to claim 5; wherein said means for changing the degree of current amplification includes changeable bias resistance means for said recording amplifier means.

7. An apparatus according to claim 6; wherein said changeable bias resistance means includes a plurality of bias resistors, and switch means for selectively including said bias resistors in a bias resistance circuit of said recording amplifier means so as to change the resistance value of said bias resistance circuit.

8. An apparatus according to claim 1; wherein said rotary magnetic heads and said magnetic recording medium are movable relative to each other at variable speeds, and said means for selectively varying said recording current includes means for changing the degree of current amplification by said recording amplifier means in accordance with the speed at which said magnetic recording heads and said magnetic recording medium are moved relative to each other.

9. An apparatus according to claim 8; wherein said means for changing the degree of current amplification includes changeable bias resistance means for said recording amplifier means.

10. An apparatus according to claim 9; wherein said changeable bias resistance means includes a plurality of bias resistors, and switch means for selectively including said bias resistors in a bias resistance circuit of said recording amplifier means so as to change the resistance value of said bias resistance circuit.

11. An apparatus according to claim 1; wherein said means for selectively varying said recording current includes changeable bias resistance means for changing the degree of current amplification by said recording amplifier means.

12. An apparatus according to claim 11; wherein said changeable bias resistance means includes a plurality of bias resistors, and switch means for selectively including said bias resistors in a bias resistance circuit of said recording amplifier means so as to change the resistance value of said bias resistance circuit.

13. An apparatus according to claim 1; wherein said means for selectively varying said recording current sets the latter at a value which is a predetermined amount above a value which yields an optimum S/N ratio of said recording current at a Nyquist frequency of said digital audio information signal.

14. An apparatus according to claim 13; wherein said magnetic recording medium may be any one of a plurality of different types, and said means for selectively varying said recording current includes means for changing the degree of current amplification by said recording amplifier means in accordance with the type of said magnetic recording medium.

* * * * *